Dec. 29, 1925.
G. E. CLAUSS
1,567,836
REENFORCED ELASTIC WEBBING
Filed March 3, 1925
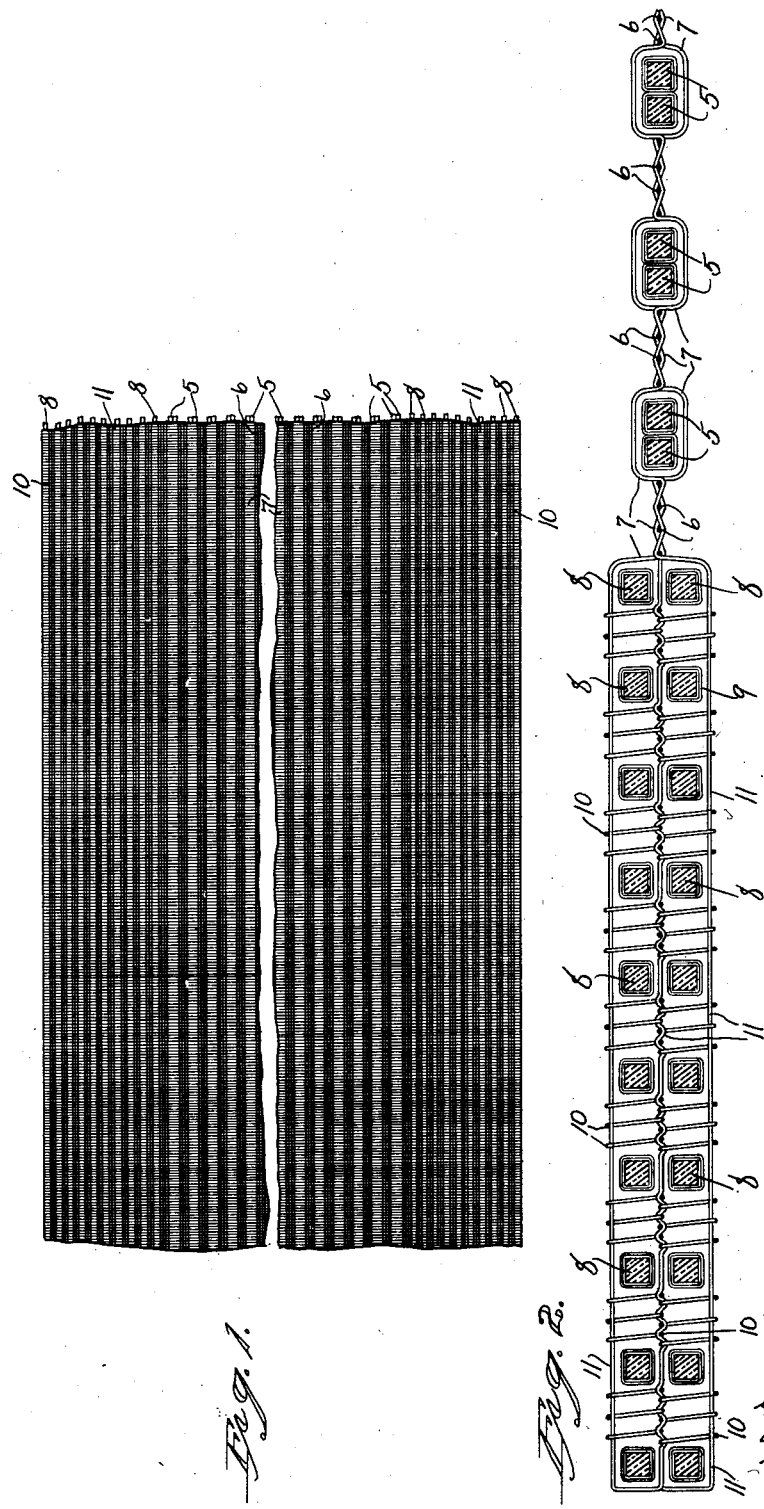

Patented Dec. 29, 1925.

1,567,836

UNITED STATES PATENT OFFICE.

GEORGE E. CLAUSS, OF ANSONIA, CONNECTICUT, ASSIGNOR TO THE ANSONIA O & C CO., OF ANSONIA, CONNECTICUT, A CORPORATION.

REENFORCED ELASTIC WEBBING.

Application filed March 3, 1925. Serial No. 12,903.

*To all whom it may concern:*

Be it known that I, GEORGE E. CLAUSS, a citizen of the United States, residing at Ansonia, in the county of New Haven and State of Connecticut, have invented a new and useful Improvement in Reenforced Elastic Webbing; and I do hereby declare the following, when taken in connection with the accompanying drawings and the characters of reference marked thereon, to be a full, clear, and exact description of the same, and which said drawings constitute part of this application, and represent, in—

Fig. 1 a broken, plan view of a section of elastic webbing, reenforced in accordance with my invention.

Fig. 2 a schematic view thereof in transverse section on an enlarged scale.

My invention relates to an improvement in that class of webbing known as "elastic webbing" which is characterized by having strands of rubber incorporated in it so as to be parallel with its warp-threads and imparting to the webbing its capacity for extension and recovery within predetermined limits, the object of my invention being to produce elastic webbing of the character described, with particular reference to its use in the manufacture of corsets, reducing garments, girdles, abdominal bands, and kindred articles of personal wear, so as to greatly improve their efficiency, durability and comfort.

With these ends in view, my invention consists in elastic webbing for use in the manufacture of corsets and kindred articles of personal wear, the said webbing being characterized by having a border-portion of higher tensional resistance than its body-portion, due to having an excess of rubber thereover per unit of width of webbing.

My invention further consists in an elastic webbing of the character and for the purpose described, having a single range of rubber warp-strands in its body-portion and a double range of rubber warp-strands in its border-portion, whereby the latter has substantially twice the resistance to tensional strain as the former per unit of width of webbing.

My invention further consists in elastic webbing of the character and for the purpose described, having certain details of construction as will be hereinafter pointed out in the claims.

In carrying out my invention, as herein shown, the body-portion of the webbing is provided with a single range of rubber warp-strands 5, arranged parallel with the textile warp-threads 6 and enclosed by textile weft-threads 7, the textile threads being of cotton or other material. The reenforced border-portion of the webbing is provided with two superimposed ranges of rubber warp-strands 8, each wrapped in textile thread as at 9, arranged parallel with textile warp-threads 10 and embedded in textile weft-threads 11, as schematically indicated in the drawing. Therefore, the border-portion of the webbing has substantially twice the tensional resistance of the body-portion thereof per unit of width of webbing. As shown, the textile warp-threads 10 act as binders for the two outer and the middle reaches of the weft-threads 11.

I do not, however, limit myself to any particular method of weaving or to any mode of grouping the rubber strands. I do not, moreover, limit myself to any predetermined excess of rubber in the border-portion of the webbing over the amount in the body-portion thereof per unit of width of webbing, but as I now view my invention, my preference is to have the ultimate weight of rubber in the border-portion substantially twice the ultimate weight of the rubber in the body-portion per unit of width of webbing, so that the resistance of the border-portion to tension will be twice the resistance of the body-portion to tension. Nor do I limit myself to any predetermined excess of cotton or corresponding textile threads in the border-portion over the amount of such threads in the body-portion per unit of width of webbing, but my preference at present is to have the ultimate content of textile threads in the border-portion of the webbing substantially twice the ultimate content thereof in the body-portion of the webbing. Of course, in producing my improved elastic webbing, the relative amounts of rubber strands and textile threads in its body- and border-portions will largely be controlled by the character of its intended use. I am thus enabled to produce a webbing in which the factor of tensional resistance is localized according to the requirements of its use, its border-portion insuring a high degree of durability and protecting its body-portion against undue stretching strains, which are very much heavier at the borders of a garment than elsewhere. In a fabric provided with a border-portion having an excess of weight of rubber over the weight of rubber in the body-portion per unit of width of webbing, the elasticity of the latter may be regulated according to actual requirements without reference to protection against undue stretching and wear. It will be understood that for all practical purposes, the tensional strength of a given piece of elastic webbing is not its ultimate strength, which may be said to be the strength of its textile threads, but rather the elastic strength of its rubber strands, which is the useful strength thereof, which, in turn, may be defined as the limit to which the rubber strands in the fabric may be stretched without impairing their ability for complete recovery or restoration to their normal, minimum-tensional condition, it being understood that the rubber-strands of elastic webbing are always under some degree of tension. For instance, a piece of elastic webbing might begin to "give" or stretch upon the imposition of a draft of one pound, stop "giving" at ten pounds, and break at one hundred pounds. The useful strength of the rubber would then lie between one and ten pounds, the latter being the limit of stretching within its ability to completely recover.

The width of the reenforced border-portion of my improved webbing will, in the practice of my invention, depend to a considerable extent upon the use to which the webbing is to be put. I do not, therefore, limit myself to any specific ratio between the body- and border-portions of my improved webbing, but I recommend making the ratio of the border- and body-portions of the webbing from as one to ten to as one to sixteen. The webbing may have one or two borders as required. If to be used for corsets and bands, it will require two borders, but if to be used for gores, but one. In any event, the border or borders will be thicker than the body-portion of the webbing.

I do not, in this application, claim a corset or personal garment made of such a fabric as herein described, reserving that for my copending application filed in even date herewith.

I claim:

1. A broad elastic webbing for use in the manufacture of corsets and kindred articles of personal wear, having a body-portion comprising a plurality of rubber strands placed side by side, and a reenforced border portion also having a plurality of rubber strands placed side by side, the said body portion having a single range of rubber strands and the said border portion having a double range of superimposed strands, whereby the tensional resistance of the border portion is substantially greater than the tensional resistance of the body portion per unit of width of webbing.

2. A broad elastic webbing for use in the manufacture of corsets and kindred articles of personal wear, having a body portion comprising a plurality of rubber strands placed side by side, and a reenforced border portion also having a plurality of rubber strands placed side by side, the said body portion having a single range of rubber strands and the said border portion having a double range of superimposed strands, whereby the tensional resistance of the border portion is substantially twice the tensional resistance of the body portion per unit of width of webbing.

3. A broad elastic webbing for use in the manufacture of corsets and kindred articles of personal wear, having a body portion comprising a plurality of rubber strands placed side by side, and a reenforced border portion also comprising a plurality of rubber strands placed side by side, the said body portion having a single range of rubber strands and the said border portion having a double range of superimposed rubber strands and employing warp threads to act as binders for the two outer and the middle reaches of its weft threads, whereby the tensional resistance of the border portion is substantially twice the tensional resistance of the body portion per unit of width of webbing.

In testimony whereof, I have signed this specification.

GEORGE E. CLAUSS.